Patented June 17, 1930

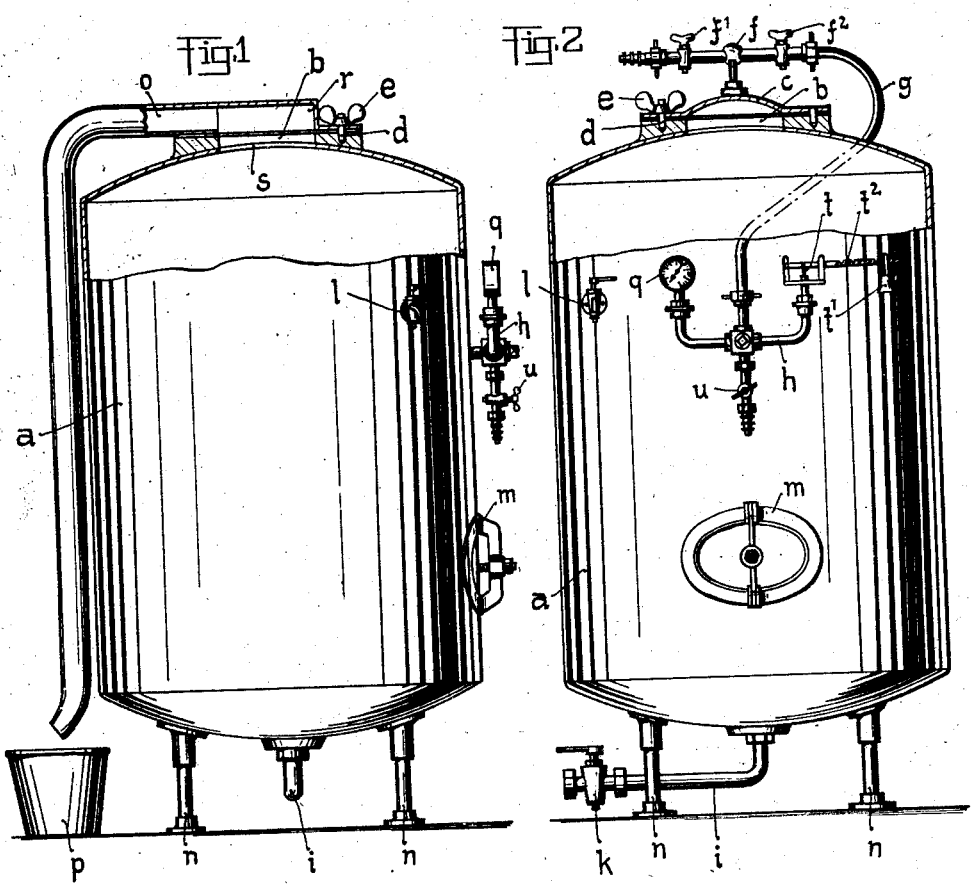
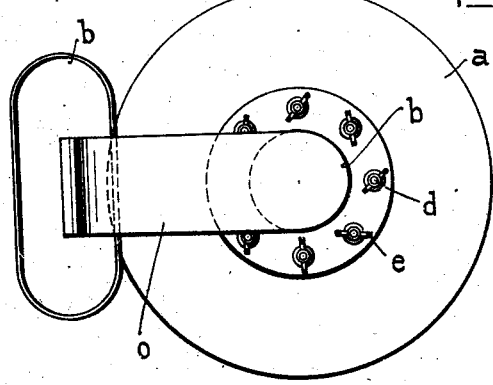

1,764,841

UNITED STATES PATENT OFFICE

HANS KOCK, OF LUBECK, GERMANY

FERMENTING VAT

Application filed July 12, 1926, Serial No. 121,939, and in Germany June 19, 1925.

My invention relates to improvements in fermenting vats, and the object of the improvements is to provide a vat which can be used for fermenting beer and other liquors, storing the beer and filling the same into bottles. With this object in view my invention consists in forming the vat at its top with an opening adapted to have either one of the attachments necessary for fermenting the beer, storing the same and filling the same into bottles secured thereto, and constructing such attachments so that they can be readily mounted on and dismounted from the said vat.

For the purpose of explaining the invention an example embodying the same has been shown in the accompanying drawing, in which the same reference characters have been used in all the views to indicate corresponding parts. In said drawing, Fig. 1, is an elevation partly in section showing the receptacle as used for fermenting beer, Fig. 2, is a similar elevation showing the apparatus as used for storing beer and filling the same into bottles, and Fig. 3, is a top-plan view of Fig. 1.

In the example shown in the drawing my improved vat $a$ is mounted on legs $n$, and it has a pipe $i$ connected to its bottom for filling the same or removing the liquor therefrom. Further, the vat is provided with a manhole $m$ for cleaning the same. At its top the vat is provided with a hole $s$ and a flange $b$ fixed to the wall of the vat around the said hole. The said flange $b$ is adapted to have various apparatus secured thereto. For fermenting beer within the vat I fix a cap or lid $r$ to the flange $b$ by means of screws $d$ and wing nuts $e$, the said cap $r$ being connected with a pipe $o$ through which the yeast is delivered into a receptacle $p$. Further, the vat is provided with a test cock $l$ for taking small amounts of beer from the vat.

When using the vat for storing the beer I remove the cap $r$ and I place a lid $c$ on the flange $b$ and I secure the same in position by means of the wing nuts $e$, the holes for the passage of the screws $d$ having the same position in the lid $c$ as in the cap $r$. The lid $c$ has a tubular member $f$ fixed thereto, and the said member is provided with two branches $f^1$ and $f^2$ each including a valve. The branch $f^2$ is adapted to be connected by means of a flexible tube $g$ with an apparatus for controlling the pressure within the vat. As is known to those skilled in the art, when storing the beer within the vat the pressure is gradually raised by continued fermentation, and it is desirable to maintain a certain pressure within the vat, because otherwise the quality of the beer is spoilt. As shown in Fig. 1, the apparatus for controlling the pressure consists of a suitable fitting having four branches, the upper branch being connected to the tube $g$, the branch directed to the left carrying a manometer $q$, and the branch directed to the right being provided with a safety valve $t$ provided with a weighted body $t^1$ adjustable on the lever $t^2$ for regulating the pressure maintained within the vat by the safety valve $t$. The downwardly directed branch is provided with a valve or cock $u$, and it is adapted to be connected to a supply of a suitable pressure medium such as compressed air.

The pressure produced within the vat while storing the beer can be ascertained from the manometer $q$. Should the pressure rise above a certain height the valve $t$ is automatically opened as the internal pressure overcomes the weight of body $t^1$ and lifts the valve.

For filling the beer into casks, the compressed air supply is connected to the lower branch of the tubular member $h$, and the beer is delivered through the pipe $i$ after opening the cocks $u$ and $k$.

In some cases I provide one tubular member such as $h$ for a plurality of vats, in order to have exactly the same pressure in all the vats, and to reduce the cost of the apparatus. In this case the left hand branch of the tubular member $f$ is made use of, the left hand branch of the said tubular member being connected to a common supply for compressed air, while the right hand branch is connected through a flexible tube with a pressure regulating apparatus such as $h$ and the lower branch is connected to the other vats in obvious manner.

I claim:

An apparatus for the manufacture of beer, comprising a vat, a flange surrounding an opening in the top of the vat, a plate secured to the flange, a pipe connected to said plate, a pipe protruding from the side of the vat, a four-branched fitting on said last-named pipe, a connection from one of the four branches to an end of the first-named pipe, a manometer and a safety valve connected respectively to two other branches, means for connecting the fourth branch to a source of compressed air, and means for connecting the other end of said first-named pipe to a source of compressed air, substantially as and for the purposes set forth.

In testimony whereof I have hereunto set my hand.

HANS KOCK.